(12) United States Patent
Mullis, II et al.

(10) Patent No.: US 9,864,643 B1
(45) Date of Patent: Jan. 9, 2018

(54) USING LOCKS OF DIFFERENT SCOPES IN A DATA STORAGE SYSTEM TO OPTIMIZE PERFORMANCE AND COMPLEXITY

(71) Applicant: EMC Corporation, Hopkinton, MA (US)

(72) Inventors: Samuel L. Mullis, II, Raleigh, NC (US); Miles A. de Forest, Bahama, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 262 days.

(21) Appl. No.: 14/788,732

(22) Filed: Jun. 30, 2015

Related U.S. Application Data

(60) Provisional application No. 62/157,142, filed on May 5, 2015.

(51) Int. Cl.
  *G06F 9/52* (2006.01)
  *G06F 13/42* (2006.01)

(52) U.S. Cl.
  CPC .......... *G06F 9/526* (2013.01); *G06F 13/4221* (2013.01)

(58) Field of Classification Search
  CPC ...................................................... G06F 9/526
  USPC ............................................................ 710/200
  See application file for complete search history.

(56) References Cited

U.S. PATENT DOCUMENTS

| | | | | |
|---|---|---|---|---|
| 6,952,736 B1 * | 10/2005 | Westbrook | ........ | G06F 17/30362 707/999.008 |
| 7,761,670 B2 * | 7/2010 | Holt | ........................ | G06F 9/526 711/114 |
| 8,719,845 B2 * | 5/2014 | Augustine | ............... | G06F 9/526 718/1 |
| 8,959,388 B1 | 2/2015 | Kuang et al. | | |
| 8,996,837 B1 | 3/2015 | Bono et al. | | |
| 8,997,120 B1 | 3/2015 | Taylor et al. | | |
| 9,092,290 B1 | 7/2015 | Bono et al. | | |
| 9,152,550 B1 | 10/2015 | Taylor et al. | | |
| 9,201,802 B1 * | 12/2015 | Armangau | .......... | G06F 12/0875 |
| 9,304,999 B1 | 4/2016 | Bono et al. | | |
| 9,305,071 B1 | 4/2016 | Bono et al. | | |
| 9,424,117 B1 | 8/2016 | Bono et al. | | |
| 9,507,787 B1 | 11/2016 | Bono et al. | | |
| 9,535,630 B1 | 1/2017 | Bono et al. | | |

OTHER PUBLICATIONS

Jean-Pierre Bono, et al.; "Unified Datapath Processing With Virtualized Storage Processors"; U.S. Appl. No. 13/828,294, filed Mar. 14, 2013.

(Continued)

*Primary Examiner* — Glenn A Auve
(74) *Attorney, Agent, or Firm* — BainwoodHuang

(57) ABSTRACT

Embodiments are directed to methods for allowing an I/O path of a data storage system to directly modify an object model while bypassing the highly-contested transaction lock used by a control path. This may be done by introducing a local lock to be used for individual resources within the object model. The control path also uses this local lock mechanism (in the context of a transaction lock) for essential resources that might be accessed by the I/O path in order to avoid accessing a given essential resource at the same time as the I/O path. A data storage system, apparatus, and computer program product for performing similar methods are also provided.

13 Claims, 3 Drawing Sheets

(56) References Cited

OTHER PUBLICATIONS

Jean-Pierre Bono, et al.; "Automatically Creating Multiple Replication Sessions in Response to a Single Replication Command Entered by a User"; U.S. Appl. No. 13/837,825, filed Mar. 15, 2013.
Alan L. Taylor, et al.; "Efficient File Copy That Avoids Data Duplication"; U.S. Appl. No. 14/041,820, filed Sep. 30, 2013.

* cited by examiner

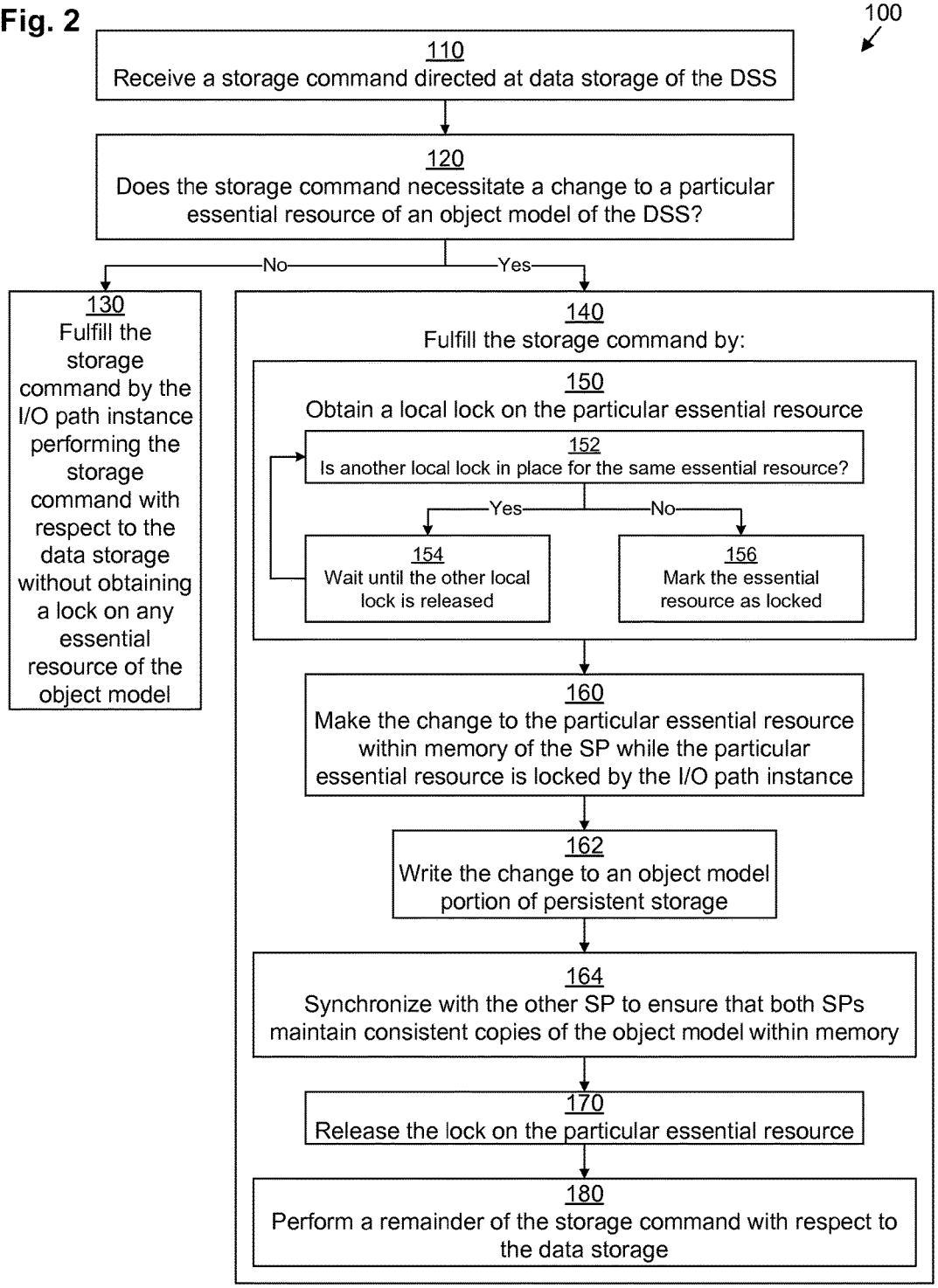

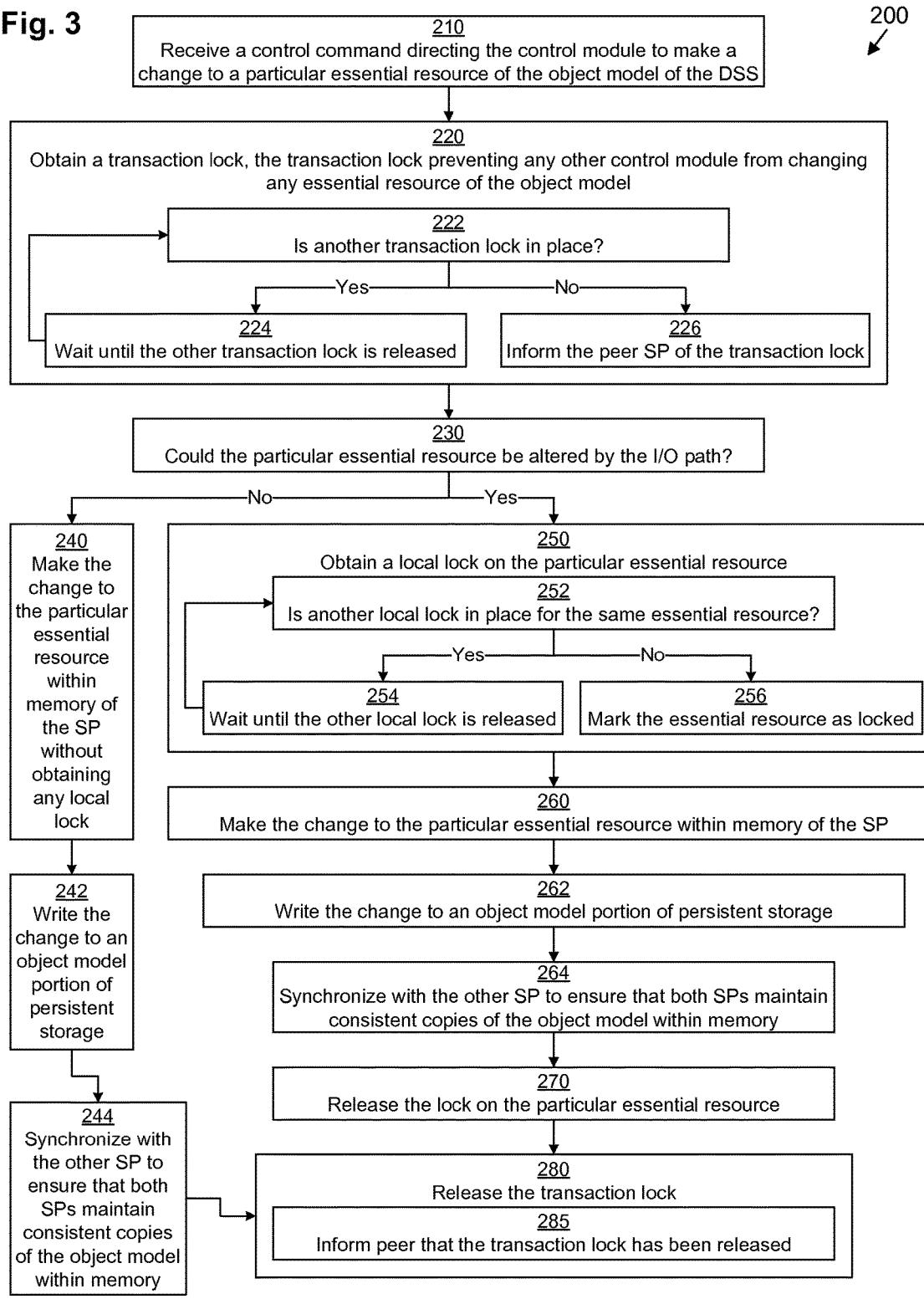

USING LOCKS OF DIFFERENT SCOPES IN A DATA STORAGE SYSTEM TO OPTIMIZE PERFORMANCE AND COMPLEXITY

RELATED APPLICATION

This Application claims priority to U.S. Provisional Patent Application No. 62/157,142 filed on May 5, 2015, the entire contents of which are incorporated herein by this reference in their entirety.

BACKGROUND

Data storage systems are used to store large amounts of data while maintaining high performance. Users are able to send I/O commands to read data from and write data to persistent storage of the data storage system via an I/O path.

Some data storage systems maintain an object model to describe logical structures within the data storage system. Administrative actions may be sent to the data storage system over a control path configured to update the object model. In order to prevent different administrative actions from interfering with each other and causing inconsistencies in the object model, the control path is configured to utilize a transaction lock, preventing any other processes from modifying the object model at the same time.

SUMMARY

Unfortunately, the above-described conventional approaches may suffer from deficiencies. Modern data storage systems may occasionally require I/O commands on the I/O path to update the object model prior to completing. However, if the I/O path were to utilize the same transaction locking mechanism as the control path, there may be unacceptably high latency times due to contention between I/O commands and control commands needing to access the object model. Some systems allow the I/O path to place changes to the object model into a queue to be executed by the control path when convenient, however, this approach can lead to data inconsistency and various other problems.

Thus, it would be desirable to implement a technique for allowing the I/O path to directly modify the object model while bypassing the highly-contested transaction lock. This may be done by introducing a local lock to be used for individual resources within the object model. The control path also uses this local lock mechanism (in the context of a transaction lock) for certain resources that might be accessed by the I/O path in order to avoid accessing a given resource at the same time as the I/O path.

In one embodiment, a method is performed by a data storage system (DSS). The method includes (a) receiving, by an I/O path instance operating on a storage processor of the DSS, a plurality of storage write commands directed at data storage of the DSS, (b) determining that fulfillment of a first storage write command of the plurality of storage write commands necessitates a change to a particular essential resource of an object model of the DSS, the object model defining settings for resources of objects that describe elements of the DSS, (c) determining that fulfillment of a second storage write command of the plurality of storage write commands does not necessitate any change to any essential resource within the object model of the DSS, and (d) fulfilling the first storage write command by the I/O path instance (I) obtaining a lock on the particular essential resource of the object model, the lock on the particular essential resource preventing any entity other than the I/O path instance operating on the storage processor of the DSS from changing the particular essential resource, (II) making the change to the particular essential resource within memory of the storage processor while the particular essential resource is locked by the I/O path instance, (III) subsequent to making the change, releasing the lock on the particular essential resource, and (IV) performing a remainder of the first storage write command with respect to the data storage of the DSS. The method also includes (e) fulfilling the second storage write command by the I/O path instance performing the second storage write command with respect to the data storage of the DSS without obtaining a lock on any essential resource of the object model. In various embodiments and use cases, a control path uses a separate transaction locking mechanism in conjunction with the local locking mechanism. A data storage system, apparatus, and computer program product for performing similar methods are also provided.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views.

FIG. 2 is a flowchart depicting an example method according to various embodiments.

FIG. 3 is a flowchart depicting an example method according to various embodiments.

DETAILED DESCRIPTION

Figure 1:
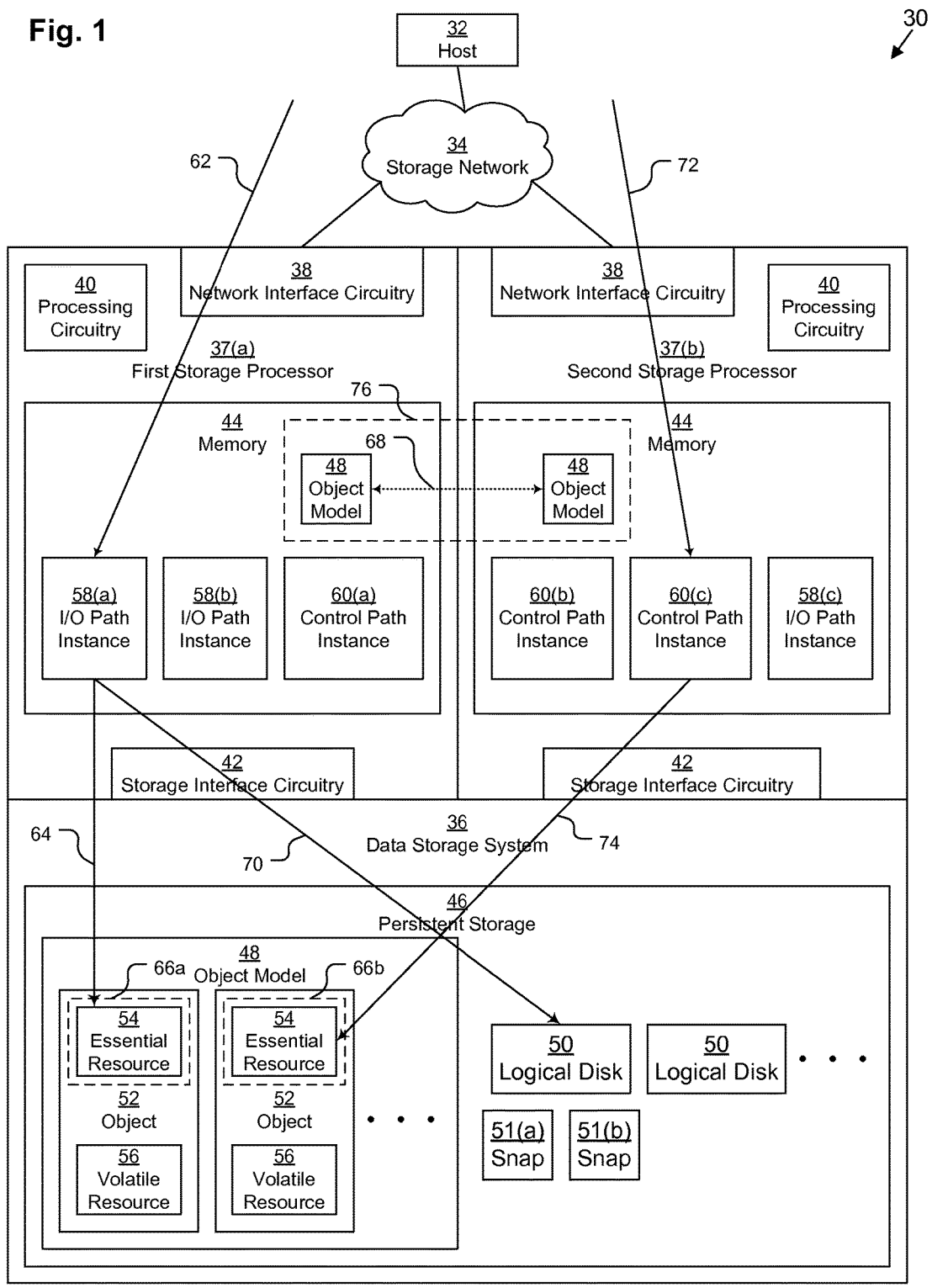
FIG. 1 is a block diagram depicting an example system and apparatus for use in connection with various embodiments.

Embodiments are directed to techniques for allowing an I/O path of a data storage system to directly modify an object model while bypassing the highly-contested transaction lock used by a control path. This may be done by introducing a local lock to be used for individual resources within the object model. The control path also uses this local lock mechanism (in the context of a transaction lock) for certain resources that might be accessed by the I/O path in order to avoid accessing a given resource at the same time as the I/O path.

FIG. 1 depicts a system 30. System 30 includes one or more host computers 32 connected to a data storage system (DSS) 36 over one or more storage networks 34. DSS 36 may be, for example, a VNX® series data storage system provided by the EMC Corporation of Hopkinton, Mass. DSS 36 is typically housed in one or more storage cabinets (not depicted). However, in some embodiments, DSS 36 may be a dispersed system operating across a network.

Host computer 32 may be any kind of computing device including a personal computer, a laptop computer, a mobile computer, a smartphone, a workstation computer, a server computer, an enterprise server, etc.

Storage network 34 may be any kind of network, including a local area network, a wide area network, a storage area network, an Ethernet network, a Fibre-Channel network, a Wireless Fidelity (WiFi) wireless network, a cellular data network, a point-to-point connection, a fabric of connections, etc., or some combination thereof.

DSS 36 includes a set of two or more storage processors (SPs) 37 (depicted as first SP 37(a) and second SP 37(b)) connected to persistent storage 46. Each SP 37 includes network interface circuitry 38 for interfacing with network 34, processing circuitry 40, storage interface circuitry 42 configured to provide access to persistent storage 46, and memory 44. These devices may be interconnected as is well-known in the art. Network interface circuitry 38 may include one or more Ethernet cards, cellular modems, Fibre Channel adapters, WiFi wireless networking adapters, any other devices for connecting to network 34, or some combination thereof. Processing circuitry 40 may be any kind of processor or set of processors configured to perform operations, such as, for example, a microprocessor, a multi-core microprocessor, a digital signal processor, a system on a chip, a collection of electronic circuits, a similar kind of controller, or any combination of the above. Storage interface circuitry 42 may include one or more SCSI adapters, Fibre Channel adapters, any other devices configured to connect to disks of persistent storage 46, or some combination thereof. In some embodiments, storage interface circuitry 42 may also include adapters configured to provide access to remote disks.

Persistent storage 46 may include one or more of any kind of persistent storage drives, such as, for example, magnetic hard disk drives and/or flash-based solid state disk drives. There may be any number of disks within persistent storage 46. Persistent storage 46 includes a set of logical disks (or logical volumes) 50. In some embodiments, each logical disk 50 may have one or more associates snapshots 51 (depicted as snaps 51(*a*) and 51(*b*)). A snapshot 51 represents the state of its associated logical disk at a prior point in time. Each snapshot 51 may share some blocks of data (not depicted) with its associated logical disk, representing data that has not changed since the snapshot 51 was made. Data blocks that have changed (not depicted) since the snapshot 51 was made are not shared between the snapshot 51 and its associated logical disk 50.

Persistent storage 46 also stores a persistent copy of an object model 48 that describes logical structures within the DSS 36. For example, object model 46 includes various objects 52 that represent logical structures of the DSS 36, such as, for example, logical disks 50, snapshots 51, pools of storage (not depicted), etc. Each object 52 includes one or more resources 54, 56, each of which has a setting. Some resources are considered essential resources 54, while others are considered volatile resources 56. Essential resources 54 (also known as persistent resources) are resources which cannot be easily derived from other resources, while volatile resources 56 are resources that may be easily derived from the essential resources 54. Thus, for example, for an object 52 representing a thickly-provisioned logical disk 50, an essential resource 54 may describe how many slices are assigned to that logical disk 50, while a volatile resource 56 may store the size of the logical disk 50, the size being easily-derived from the number of slices and the size of each slice. In some embodiments, the volatile resources 56 are not stored within the copy of the object model 48 on persistent storage 48, but are only stored within the copy of the object model 48 in memory 44.

Memory 44 may be any kind of digital system memory, such as, for example, random access memory (RAM). Memory 44 stores one or more operating systems (OSes) in operation (not depicted, e.g., Linux, UNIX, Windows, or a similar OS) and one or more applications executing on processing circuitry 40 as well as data used by those applications. Memory 44 stores various instances of an I/O path (depicted as I/O path instances 58(*a*), 58(*b*) on first SP 37(*a*) and 58(*c*) on second SP 37(*b*)) and of a control path 60 (depicted as control path instances 60(*a*) on first SP 37(*a*) and 60(*b*), 60(*c*) on second SP 37(*b*)). Memory 44 on each SP 37 also stores a local copy of the object model 48.

In some embodiments (not depicted), there may be two separate copies of the object model 48 stored in persistent storage—one used by the control path instances 60 and another used by the I/O path instances 58. Also, in some embodiments (not depicted), the copy of the object model 48 stored in memory 44 of the SPs 37 is the most well-organized, with the versions stored on persistent storage 46 being used more for restoration purposes.

The OS and the applications (e.g., I/O path instances 58 and control path instances 60) are typically also stored in persistent storage 46 so that they may be loaded into memory 44 from persistent storage 46 upon a system restart. These applications, when stored in non-transient form either in the memory 44 or in persistent storage 46, form a computer program product. The processing circuitry 40 running one or more of these applications thus forms a specialized circuit constructed and arranged to carry out the various processes described herein.

A host 32 is configured to send various commands 62, 72 to the DSS. When a host 32 sends an I/O command 62 to the DSS 36 in order to perform a read or write operation (or another kind of I/O operation such as a create, delete, format, or move operation, etc.), the I/O command 62 is processed by an I/O path instance 58 running on one of the SPs 37 (e.g., I/O path instance 58(*a*) running on first SP 37(*a*) as depicted). In many instances, the I/O command 62 can be performed by sending block commands 70 to the persistent storage 46 in order to read or write from a logical disk 50. However, under some conditions involving write commands, it may be necessary for the I/O path instance 58(*a*) to make a change 64 to one or more essential resources 54 of the object model 48. It should be understood that this may also involve a dependent change to one or more volatile resources 56. In order to make the change 64, I/O path instance 58(*a*) obtains a local lock 66*a* on the one or more essential resources 54 to be changed prior to making the change 64 within the local copy of the object model 48 stored in memory 44 of its SP 37(*a*). The change 64 may then be persisted to the copy of the object model 48 stored on persistent storage 46 and the copy of the object models 48 on the local SP 37(*a*) may be synchronized in a synchronization operation 68 onto the peer SP 37(*b*). Then the local lock 66*a* may be released.

When a host 32 sends a control command 72 to the DSS 36 in order to perform an administrative transaction on the DSS 36, the control command 72 is processed by a control path instance 60 running on one of the SPs 37 (e.g., control path instance 60(*c*) running on second SP 37(*b*) as depicted). In many instances, it may be necessary for the control path instance 60(*c*) to make a change 74 to one or more essential resources 54 of the object model 48. It should be understood that this may also involve a dependent change to one or more volatile resources 56. In order to make the change 74, control path instance 60(*c*) first obtains a transaction lock 68 to protect the object model 48 against simultaneous modification by another control path instance 60. The control path instance 60(*c*) then obtains a resource lock 66*b* on the one or more essential resources 54 to be changed prior to making the change 74 within the local copy of the object model 48 stored in memory 44 of its SP 37(*b*). The change 74 may then be persisted to the copy of the object model 48 stored on persistent storage 46 and the copy of the object models 48 on the local SP 37(*b*) may be synchronized in synchronization operation 68 onto the peer SP 37(*a*). Then the resource lock 66*b* may be released, followed by the release of the transaction lock 68. It should be understood that a resource lock 66b is similar in function to a local lock 66a; however, it is referred to as a resource lock 66b because it may not be local to the SP 37 that owns that object 52 or resource 54.

FIG. 2 illustrates an example method 100 performed by an I/O path instance 58 for allowing an I/O path instance 58 to directly modify an object model 48 while bypassing the highly-contested transaction lock 76 used by control path instances 60. This may be done by using a local (or resource) lock 66a, 66b (hereinafter "local lock 66") for individual essential resources 54 within the object model 48. It should be understood that any time a piece of software (e.g., I/O path instance 58 or control path instance 60) is described as performing a method, process, step, or function, in actuality what is meant is that a computing device (e.g., SP 37(a), 37(b) or host 32) on which that piece of software is running performs the method, process, step, or function when executing that piece of software on its processing circuitry 40. It should be understood that although depicted in one order, one or more steps or sub-steps may be combined together or performed in a different order, unless explicitly excluded.

In step 110, I/O path instance 58 receives a storage command 62 directed at data storage of the DSS 36. In particular, the storage command 62 is directed at a logical disk 50 or snapshot 51 of persistent storage 46.

In step 120, I/O path instance 58 determines whether the storage command 62 necessitates a change 64 to a particular essential resource 54 of an object model 48 of the DSS 36. For example, if the storage command 62 is directed towards an address of a thinly-provisioned logical disk 50 that does not yet have any underlying data as backing store, I/O path instance 58 may determine that a change 64 to a particular essential resource 54 is needed. In particular, the thinly-provisioned logical disk 50 needs additional backing store allocated to it. There are different ways to do this in different embodiments, but, in one embodiment, this involves obtaining insurance from a pool object, the pool object representing a pool of available slices of storage. A slice is a chunk of storage space having contiguous logical addresses within a RAID group; in one embodiment, a slice has a size of 256 megabytes; in another embodiment, a slice has a size of 1 gigabyte, however, other sizes are also possible. Obtaining the insurance from the pool object may include updating a mapping resource of the pool object to indicate an assignment of a particular slice number within the pool to the particular logical disk 50. Once the insurance is obtained from the pool resource, a slice may be allocated to the logical disk 50; this may also involve modifying a resource within an object representing the logical disk 50, the resource including a list of slice identifiers that make up the backing store of that logical disk 50 together with a mapping from a logical address space of the logical disk 50 to particular slices. Thus, the particular essential resource 54 needing a change 64 might include a mapping resource of a pool object. The particular essential resource 54 needing a change 64 might also include a slice identifier table of a logical disk 50 object.

In another example, even if the storage command 62 is directed towards an address of a thickly-provisioned logical disk 50, it is possible that there could be a "hole" within the thickly-provisioned logical disk 50, the hole being a set of addresses without any underlying backing store currently allocated to it. This can happen if the thickly-provisioned logical disk 50 was previously fully-provisioned, but then a snapshot 51 was made and then a set of blocks of the thickly-provisioned logical disk 50 was deleted. This is a "write split," meaning that the deleted blocks would continue to be assigned to the snapshot 51, but they would be unassigned from the logical disk 50, leaving a hole in the address space of the logical disk 50. Thus, the particular essential resource 54 needing a change 64 might include a mapping resource of a pool object. The particular essential resource 54 needing a change 64 might also include a slice identifier table of a logical disk 50 object.

In another example, the storage command 62 may be directed towards an address of a logical disk 50 or snapshot 51 that already has a backing store. In such a case, the I/O path instance 58 might determine that the storage command 62 does not necessitate a change 64 to any essential resource 54 of the object model 48.

If the I/O path instance 58 determines in step 120 that the storage command 62 does not necessitate a change 64 to any essential resource 54 of the object model 48, then operation proceeds with step 130. In step 130, I/O path instance 58 fulfills the storage command 62 by performing the storage command 62 with respect to the data storage (e.g., logical disk 50 or snapshot 51) without obtaining a lock on any essential resource 54 of the object model 48.

If the I/O path instance 58 determines in step 120 that the storage command 62 does necessitate a change 64 to an essential resource 54 of the object model 48, then operation proceeds with step 140. In step 140, I/O path instance 58 fulfills the storage command 62 by performing sub-steps 150, 160, 162, 164, 170, and 180. The order of these sub-steps is important, although, in some embodiments, the order of sub-steps 162 and 164 may be reversed.

In sub-step 150, I/O path instance 58 obtains a local lock 66 on the particular essential resource 54 (as determined in step 120). In some cases, sub-step 150 may be repeated for each of several essential resources 54 for which a change 64 is needed. Sub-step 150 may be performed by performing sub-sub-steps 152-156.

In sub-sub-step 152, I/O path instance 58 determines whether or not another local lock 66 is already in place for the same particular essential resource 54. If so, then this I/O path instance 58 may not access that particular essential resource 54, so operation proceeds with sub-sub-step 154, in which I/O path instance 58 waits until the other local lock 66 is released, at which point, I/O path instance 58 may check again whether or not another local lock 66 is already in place for the same particular essential resource 54.

If no other local lock 66 is in place for the particular essential resource 54, then operation proceeds with sub-sub-step 156. In sub-sub-step 156, I/O path instance 58 marks the particular essential resource 54 as being locked by local lock 66.

In sub-step 160, I/O path instance 58 makes the change 64 to the particular essential resource 54 within memory 44 of the SP 37 while the particular essential resource 54 is locked by the I/O path instance 58.

In sub-step 162, I/O path instance 58 writes the change 64 to the copy of the object model 48 within persistent storage 46. In some embodiments, sub-step 162 includes writing only a log of changes to the copy of the object model 48 specific to the I/O path instances 58 within persistent storage 46. In sub-step 164, I/O path instance 58 synchronizes the object model 48 with the other SP 37 to ensure that both SPs 37 maintain consistent copies of the object model 48 within their respective memories 44. This may include sending a copy of the change 64 to the other SP 37.

In sub-step 170, I/O path instance 58 releases the local lock 66 on the particular essential resource 54. In some embodiments, sub-step 170 may be repeated for each of several essential resources 54 for which a change 64 is needed. In other embodiments, sub-steps 150-170 may be repeated for each of several essential resources 54 for which a change 64 is needed.

Finally, in sub-step 180, I/O path instance 58 performs a remainder of the storage command 62 with respect to the data storage 46 by sending block commands 70 to the persistent storage 46 in order to read or write from a logical disk 50 or snapshot 51.

FIG. 3 illustrates another example method 200 performed by a control path instance 60 for using a local locking mechanism in the context of a transaction lock 76 for essential resources 54 that might be accessed by the I/O path in order to avoid accessing a given essential resource 54 at the same time as an I/O path instance 58. It should be understood that although depicted in one order, one or more steps or sub-steps may be combined together or performed in a different order, unless explicitly excluded.

In step 210, control path instance 60 receives a control command 72 directing the control path instance 60 to make a change 74 to a particular essential resource 54 of the object model 48 of the DSS 36.

In step 220, control path instance 60 obtains a transaction lock 76. The transaction lock 76 prevents any other control path instance 60 from changing any essential resource 54 of the object model while pending. Step 220 may be performed by performing sub-steps 222-226.

In sub-step 222, control path instance 60 determines whether or not another transaction lock 76 is already in place. If so, then control path instance 60 may not access any essential resource 54 of the object model 48, so operation proceeds with sub-step 224, in which control path instance 60 waits until the other transaction lock 76 is released, at which point, control path instance 60 may check again whether or not another transaction lock 76 is already in place. If no other transaction lock 76 is in place, then operation proceeds with sub-step 226. In sub-step 226, control path instance 60 initiates the transaction lock and informs the peer SP 37 of the transaction lock 76.

In step 230, control path instance 60 determines whether or not the particular essential resource 54 to be changed by the control command 72 could possibly be affected by an I/O path instance 58. For example, there may be certain essential resources 54 that are not alterable by an I/O path instance 58, such as the name of an object 52.

If the particular essential resource 54 to be changed by the control command 72 cannot possibly be affected by an I/O path instance 58, then there is no need to obtain a local lock 66 for that essential resource 54, since the transaction lock 76 already protects against any other control path instance 60 making a modification. Thus, operation proceeds with step 240. In step 240, the control path instance 60 makes the change 74 to the particular essential resource 54 within memory 44 of the SP 37 without obtaining any local lock 66. Then, in step 242, the control path instance 60 writes the change 74 to the object model 48 portion of persistent storage 48. Then, in step 244, the control path instance 60 synchronizes the object model 48 with the other SP 37 to ensure that both SPs 37 maintain consistent copies of the object model 48 within their respective memories 44. This may include sending a copy of the change 74 to the other SP 37. It should be understood that, in some embodiments, the order of steps 242 and 244 may be reversed.

If the particular essential resource 54 to be changed by the control command 72 can possibly be affected by an I/O path instance 58, then a local lock 66 is needed in case an I/O path instance 58 happens to try to access the same particular essential resource 54 (either before or after). Thus, operation proceeds with step 250.

In step 250, control path instance 60 obtains a local lock 66 on the particular essential resource 54. Step 250 may be performed by performing sub-steps 252-256. If several particular essential resources 54 need to be changed as part of the control command 72, then step 250 may be repeated for each particular essential resource 54. Step 250 may be performed (or repeated) at whatever stage in the fulfillment of the control command 72 each essential resource 54 is needed, although typically this will always happen prior to steps 262-270.

In sub-step 252, control path instance 60 determines whether or not another local lock 66 is already in place for the same particular essential resource 54. If so, then this control path instance 60 may not access that particular essential resource 54, so operation proceeds with sub-step 254, in which control path instance 60 waits until the other local lock 66 is released, at which point, control path instance 60 may check again whether or not another local lock 66 is already in place for the same particular essential resource 54.

If no other local lock 66 is in place for the particular essential resource 54, then operation proceeds with sub-step 256. In sub-step 256, control path instance 60 marks the particular essential resource 54 as being locked by local lock 66.

In step 260, control path instance 60 makes the change 74 to the particular essential resource 54 within memory 44 of the SP 37 while the particular essential resource 54 is locked by the control path instance 60.

In step 262, control path instance 60 writes the change 74 to the copy of the object model 48 within persistent storage 46. In some embodiments, step 262 includes writing to the copy of the object model 48 specific to the control path instances 60 within persistent storage 46. In step 264, control path instance 60 synchronizes the object model 48 with the other SP 37 to ensure that both SPs 37 maintain consistent copies of the object model 48 within their respective memories 44. This may include sending a copy of the change 64 to the other SP 37.

In step 270, control path instance 60 releases the local lock 66 on the particular essential resource 54. In some embodiments, after step 270, control path instance 60 may return to step 250 for another particular essential resource 54 that needs to be changed to fulfill control command 72. If multiple essential resources 54 are changed during fulfillment of the control command, then, in one embodiment, the local locks 66 for all of the essential resources 54 will remain locked until steps 262, 264, and 270 can be performed for all essential resources 54 at once.

In step 280, control path instance 60 releases the transaction lock 76. This may include performing sub-step 285 in which the control path instance 60 informs the peer SP 37 that the transaction lock 76 has been released.

The order of steps 250, 260, 262, 264, 270, and 280 is important, although, in some embodiments, the order of sub-steps 262 and 264 may be reversed.

It should be understood that methods 100 and 200 may be performed in conjunction by an I/O path instance 58 and a control path instance 60, respectively. Thus, an I/O path instance 58 may begin performing method 100 followed by control path instance 60 performing method 200. In addition a control path instance 60 may begin performing method 200 followed by I/O path instance 58 performing method 100.

Thus, techniques have been provided for allowing an I/O path instance 58 to directly modify an object model 48 while bypassing the highly-contested transaction lock 76 used by a control path instance 60. This may be done by introducing a local lock 66 to be used for individual essential resources 54 within the object model 48. A control path instance 60 also uses this local lock mechanism (in the context of a transaction lock 76) for essential resources that might be accessed by an I/O path instance 58 in order to avoid accessing a given essential resource at the same time as the I/O path instance 58.

While various embodiments of the present disclosure have been particularly shown and described, it will be understood by those skilled in the art that various changes in form and details may be made therein without departing from the spirit and scope of the present disclosure as defined by the appended claims.

For example, it should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Finally, it should be understood that all embodiments which have been described may be combined in all possible combinations with each other, except to the extent that such combinations have been explicitly excluded.

Finally, even if a technique, method, apparatus, or other concept is specifically labeled as "conventional," Applicant make no admission that such technique, method, apparatus, or other concept is actually prior art under 35 U.S.C. §102 or 35 U.S.C. §103, such determination being a legal determination that depends upon many factors, not all of which are known to Applicant at this time.

What is claimed is:

1. A method performed by a data storage system (DSS), the method comprising:
   receiving, by an I/O path instance operating on a storage processor of the DSS, a plurality of storage write commands directed at data storage of the DSS;
   determining that fulfillment of a first storage write command of the plurality of storage write commands necessitates a change to a particular essential resource of an object model of the DSS, the object model defining settings for resources of objects that describe elements of the DSS;
   determining that fulfillment of a second storage write command of the plurality of storage write commands does not necessitate any change to any essential resource within the object model of the DSS;
   fulfilling the first storage write command by the I/O path instance:
      obtaining a lock on the particular essential resource of the object model, the lock on the particular essential resource preventing any entity other than the I/O path instance operating on the storage processor of the DSS from changing the particular essential resource;
      making the change to the particular essential resource within memory of the storage processor while the particular essential resource is locked by the I/O path instance;
      subsequent to making the change, releasing the lock on the particular essential resource; and
      performing a remainder of the first storage write command with respect to the data storage of the DSS; and
   fulfilling the second storage write command by the I/O path instance performing the second storage write command with respect to the data storage of the DSS without obtaining a lock on any essential resource of the object model.

2. The method of claim 1, wherein the storage processor is a first storage processor and fulfilling the first storage command by the I/O path instance further includes, subsequent to making the change and prior to releasing the lock on the particular essential resource:
   writing the change to an object model portion of persistent storage of the DSS; and
   synchronizing with a second storage processor of the DSS to ensure that the second storage processor maintains a consistent copy of the object model within memory of the second storage processor.

3. The method of claim 2, wherein the method further comprises:
   subsequent to receiving the first storage write command by the I/O path instance, receiving, by a control path instance operating on one of the first storage processor and the second storage processor of the DSS, a control command directing the control path instance to make another change to the particular essential resource of the object model of the DSS;
   obtaining a transaction lock by the control path instance, the transaction lock preventing any other control path instance from changing any essential resource of the object model of the DSS;
   subsequent to obtaining the transaction lock, waiting for the lock on the particular essential resource to be released and subsequently obtaining another lock on the particular essential resource by the control path instance, the other lock preventing any entity other than the control path instance from changing the particular essential resource;
   making the other change to the particular essential resource within memory of the one of the first storage processor and the second storage processor by the control path instance while the particular essential resource is locked by the control path instance; and
   subsequent to making the other change, by the control path instance:
      (1) writing the other change to the object model portion of persistent storage of the DSS;
      (2) synchronizing with the other of the first storage processor and the second storage processor of the DSS to ensure that both the first storage processor and the second storage processor maintain consistent copies of the object model within memory;
      (3) releasing the other lock on the particular essential resource; and
      (4) releasing the transaction lock.

4. The method of claim 2, wherein the method further comprises:
   subsequent to receiving the first storage write command by the I/O path instance, receiving, by a control path instance operating on one of the first storage processor and the second storage processor of the DSS, a control command directing the control path instance to make another change to another particular essential resource of the object model of the DSS;
obtaining a transaction lock by the control path instance, the transaction lock preventing any other control path instance from changing any essential resource of the object model of the DSS;
subsequent to obtaining the transaction lock, obtaining another lock on the other particular essential resource by the control path instance, the other lock preventing any entity other than the control path instance from changing the other particular essential resource;
making the other change to the particular essential resource within memory of the one of the first storage processor and the second storage processor by the control path instance while the other particular essential resource is locked by the control path instance; and
subsequent to making the other change, by the control path instance:
  (1) writing the other change to the object model portion of persistent storage of the DSS;
  (2) synchronizing with the other of the first storage processor and the second storage processor of the DSS to ensure that both the first storage processor and the second storage processor maintain consistent copies of the object model within memory;
  (3) releasing the other lock on the other particular essential resource; and
  (4) releasing the transaction lock.

5. The method of claim 4, wherein the method further comprises:
receiving, by another I/O path instance operating on one of the first storage processor and the second storage processor of the DSS, a third storage write command directed at data storage of the DSS;
determining that fulfillment of the third storage write command of the plurality of storage write commands necessitates yet another change to the other particular essential resource;
waiting for the other lock on the other particular essential resource to be released and subsequently obtaining yet another lock on the other particular essential resource by the other I/O path instance, the yet other lock preventing any entity other than the other I/O path instance from changing the other particular essential resource;
making the yet other change to the other particular essential resource within memory of the one of the first storage processor and the second storage processor by the other I/O path instance while the other particular essential resource is locked by the other I/O path instance; and
subsequent to making the yet other change, by the other I/O path instance:
  (1) writing the yet other change to the object model portion of persistent storage of the DSS;
  (2) synchronizing with the other of the first storage processor and the second storage processor of the DSS to ensure that both the first storage processor and the second storage processor maintain consistent copies of the object model within memory; and
  (3) releasing the yet other lock on the other particular essential resource; and
  (4) performing a remainder of the third storage write command with respect to the data storage of the DSS.

6. The method of claim 4, wherein the method further comprises:
receiving, by another I/O path instance operating on one of the first storage processor and the second storage processor of the DSS, a third storage write command directed at data storage of the DSS;
determining that fulfillment of the third storage write command of the plurality of storage write commands necessitates yet another change to yet another particular essential resource;
obtaining yet another lock on the yet other particular essential resource by the other I/O path instance, the yet other lock preventing any entity other than the other I/O path instance from changing the yet other particular essential resource;
making the yet other change to the yet other particular essential resource within memory of the one of the first storage processor and the second storage processor by the other I/O path instance while the yet other particular essential resource is locked by the other I/O path instance; and
subsequent to making the yet other change, by the other I/O path instance:
  (1) writing the yet other change to the object model portion of persistent storage of the DSS;
  (2) synchronizing with the other of the first storage processor and the second storage processor of the DSS to ensure that both the first storage processor and the second storage processor maintain consistent copies of the object model within memory; and
  (3) releasing the yet other lock on the yet other particular essential resource; and
  (4) performing a remainder of the third storage write command with respect to the data storage of the DSS.

7. The method of claim 2,
wherein the method further comprises:
  prior to receiving the first storage write command by the I/O path instance, receiving, by a control path instance operating on one of the first storage processor and the second storage processor of the DSS, a control command directing the control path instance to make another change to another particular essential resource of the object model of the DSS;
  obtaining a transaction lock by the control path instance, the transaction lock preventing any other control path instance from changing any essential resource of the object model of the DSS;
  subsequent to obtaining the transaction lock, obtaining another lock on the other particular essential resource by the control path instance, the other lock preventing any entity other than the control path instance from changing the other particular essential resource;
  making the other change to the particular essential resource within memory of the one of the first storage processor and the second storage processor by the control path instance while the other particular essential resource is locked by the control path instance; and
  subsequent to making the other change, by the control path instance:
    (1) writing the other change to the object model portion of persistent storage of the DSS;
    (2) synchronizing with the other of the first storage processor and the second storage processor of the DSS to ensure that both the first storage processor and the second storage processor maintain consistent copies of the object model within memory;
(3) releasing the other lock on the other particular essential resource; and
(4) releasing the transaction lock, and
wherein fulfilling the first storage write command is performed by the I/O path instance subsequent to the control path instance obtaining the other lock and prior to the control path instance releasing the other lock.

8. The method of claim 2,
wherein the method further comprises:
prior to receiving the first storage write command by the I/O path instance, receiving, by a control path instance operating on one of the first storage processor and the second storage processor of the DSS, a control command directing the control path instance to make another change to the particular essential resource of the object model of the DSS;
obtaining a transaction lock by the control path instance, the transaction lock preventing any other control path instance from changing any essential resource of the object model of the DSS;
subsequent to obtaining the transaction lock, obtaining another lock on the particular essential resource by the control path instance, the other lock preventing any entity other than the control path instance from changing the particular essential resource;
making the other change to the particular essential resource within memory of the one of the first storage processor and the second storage processor by the control path instance while the particular essential resource is locked by the control path instance; and
subsequent to making the other change, by the control path instance:
(1) writing the other change to the object model portion of persistent storage of the DSS;
(2) synchronizing with the other of the first storage processor and the second storage processor of the DSS to ensure that both the first storage processor and the second storage processor maintain consistent copies of the object model within memory;
(3) releasing the other lock on the particular essential resource; and
(4) releasing the transaction lock; and
wherein fulfilling the first storage write command by the I/O path instance further includes waiting for the other lock on the particular essential resource to be released by the control path instance prior to obtaining the lock on the particular essential resource by the I/O path instance.

9. The method of claim 2, wherein the method further comprises:
subsequent to receiving the first storage write command by the I/O path instance, receiving, by another I/O path instance operating on one of the first storage processor and the second storage processor of the DSS, a third storage write command directed at data storage of the DSS;
determining that fulfillment of the third storage write command necessitates another change to the particular essential resource; and
fulfilling the third storage write command by the other I/O path instance:
waiting for the lock on the particular essential resource to be released by the I/O path instance and subsequently obtaining another lock on the particular essential resource, the other lock on the particular essential resource preventing any entity other than the other I/O path instance from changing the particular essential resource;
making the other change to the particular essential resource within memory of the one of the first storage processor and the second storage processor while the particular essential resource is locked by the other I/O path instance;
subsequent to making the other change:
(1) writing the other change to the object model portion of persistent storage of the DSS;
(2) synchronizing with the other of the first storage processor and the second storage processor of the DSS to ensure that both the first storage processor and the second storage processor maintain consistent copies of the object model within memory;
(3) releasing the other lock on the particular essential resource; and
(4) performing a remainder of the third storage write command with respect to the data storage of the DSS.

10. The method of claim 1,
wherein the first storage write command includes an instruction to write data to an address of a thinly-provisioned logical disk for which backing store has not yet been provisioned;
wherein the particular essential resource of the object model of the DSS includes a mapping of slices of storage within a particular storage pool to particular logical disks; and
wherein the change to the particular essential resource of the object model of the DSS includes a change to the mapping to add an assignment of a particular slice of storage of the particular storage pool to the thinly-provisioned logical disk as backing for a set of addresses of the thinly-provisioned logical disk including the address of the instruction of the first storage write command.

11. The method of claim 1,
wherein the first storage write command includes an instruction to write data to an address of a thickly-provisioned logical disk having a hole therein caused by a write split due to a snapshot, the address being within the hole, therefore the address not having a backing store;
wherein the particular essential resource of the object model of the DSS includes a mapping of slices of storage within a particular storage pool to particular logical disks; and
wherein the change to the particular essential resource of the object model of the DSS includes a change to the mapping to add an assignment of a particular slice of storage of the particular storage pool to the thickly-provisioned logical disk as backing for a set of addresses of the hole of the thickly-provisioned logical disk including the address of the instruction of the first storage write command.

12. A method, comprising:
fulfilling a storage write command directed at persistent data storage of a data storage system (DSS) by an I/O path instance operating on the DSS, the storage write command necessitating a first change to a first essential resource of an object model of the DSS, the object model defining settings for resources of objects that describe elements of the DSS, the I/O path instance operating on the DSS fulfilling the storage write command by:
  obtaining a first lock on the first essential resource once the first essential resource is not locked by another entity, the first lock preventing any entity other than the I/O path instance operating on the DSS from changing the first essential resource;
  making the first change to the first essential resource while the I/O path instance has the first lock; and
  subsequent to making the first change, releasing the first lock on the first essential resource; and
fulfilling a control command by a control path instance operating on the DSS, the control command directing the control path instance to make a second change to a second essential resource of the object model of the DSS, the control path instance operating on the DSS fulfilling the control command by:
  obtaining a transaction lock, the transaction lock preventing any other control path instance from changing any essential resource of the object model of the DSS;
  subsequent to obtaining the transaction lock, obtaining a second lock on the second essential resource once the second essential resource is not locked by another entity, the second lock preventing any entity other than the control path instance operating on the DSS from changing the second essential resource;
  making the second change to the second essential resource while the control path instance has the second lock;
  subsequent to making the second change, releasing the second lock on the second essential resource; and
  subsequent to releasing the second lock, releasing the transaction lock.

13. A data storage system (DSS) apparatus comprising:
persistent data storage; and
processing circuitry coupled to memory, the processing circuitry being configured to:
  fulfill a storage write command directed at persistent data storage of the DSS by an I/O path instance operating on the processing circuitry:
    determining whether the storage write command necessitates a first change to a first essential resource of an object model of the DSS, the object model defining settings for resources of objects that describe elements of the DSS;
    if the storage write command necessitates the first change to the first essential resource, then:
      obtaining a first lock on the first essential resource once the first essential resource is not locked by another entity, the first lock preventing any entity other than the I/O path instance operating on the processing circuitry of the DSS from changing the first essential resource;
      making the first change to the first essential resource while the I/O path instance has the first lock;
      subsequent to making the first change, releasing the first lock on the first essential resource; and
      performing a remainder of the storage write command with respect to the persistent data storage; and
    if the storage write command does not necessitate the first change to the first essential resource, then performing a remainder of the storage write command with respect to the persistent data storage without obtaining a lock on any essential resource of the object model;
  fulfill a control command by a control path instance operating on the processing circuitry, the control command directing the control path instance to make a second change to a second essential resource of the object model of the DSS, the control path instance operating on the processing circuitry fulfilling the control command by:
    obtaining a transaction lock, the transaction lock preventing any other control path instance from changing any essential resource of the object model of the DSS;
    determining whether the second change to the second essential resource is of a type that could be performed by the I/O path instance;
    if the second change is of a type that could be performed by the I/O path instance, then:
      subsequent to obtaining the transaction lock, obtaining a second lock on the second essential resource once the second essential resource is not locked by another entity, the second lock preventing any entity other than the control path instance operating on the processing circuitry of the DSS from changing the second essential resource;
      making the second change to the second essential resource while the control path instance has the second lock;
      subsequent to making the second change, releasing the second lock on the second essential resource; and
      subsequent to releasing the second lock, releasing the transaction lock; and
    if the second change is not of a type that could be performed by the I/O path instance, then:
      making the second change to the second essential resource without obtaining a lock on any essential resource of the object model; and
      subsequent to making the second change, releasing the transaction lock.

\* \* \* \* \*